C. B. BROWN.
Mowing Machine.
No. 9,446. Patented Dec. 7, 1852.
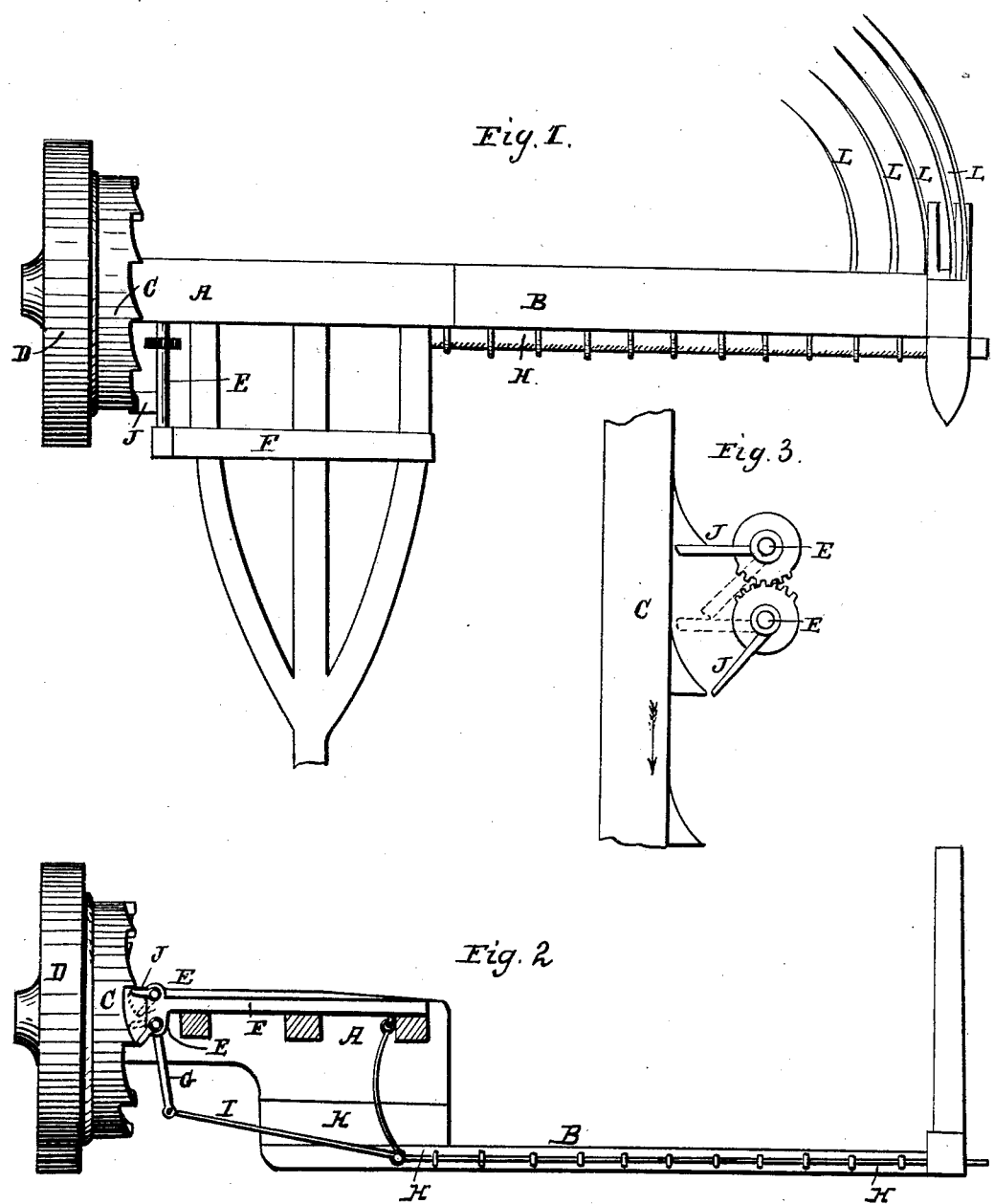

UNITED STATES PATENT OFFICE.

C. B. BROWN, OF GRIGGSVILLE, ILLINOIS.

IMPROVEMENT IN GRAIN AND GRASS HARVESTERS.

Specification forming part of Letters Patent 9,446, dated December 7, 1852.

*To all whom it may concern:*

Be it known that I, C. B. BROWN, of Griggsville, in the county of Pike and State of Illinois, have invented a new and useful Improvement in the Reaping and Mowing Machine; and I hereby declare the following to be a clear and exact description of the same, reference being had to the drawings herewith presented, which drawings constitute a part of said description, viz:

Figure 1 is a top view of said machine with the reel removed and part of the tongue taken off. A is the axle. B is the bottom timber or sill. C is the crown-wheel. D is the main wheel or driver connected to the side of wheel C. E E are the escapement-shafts, (one is seen at Fig. 1; both are seen at Fig. 2,) shown endwise.

Fig. 2 is a front view having also the reel and tongue removed. F is the cross-bar that holds the end of the two shafts. This bar is secured on the top of the tongue in such manner as to be movable endwise in order to bring the escapement out of gear, when required. These shafts E E are connected by segments of wheels, or otherwise, so as to turn simultaneously, and in contrary directions. An arm, G, projecting from one of the shafts is connected by the rod I to the blade or sickle H H, and the two pallets J J, projecting from the two shafts are acted upon alternately by the cogs of the wheel C, (see Fig. 3,) which is an enlarged view of the part of wheel C and the shafts E E seen endwise, showing how the pallets are pressed down by the cogs. The dotted lines show the extent of their motion.

It is mentioned above that the two pallets J and J, projecting from the shafts E and E, are acted upon alternately by the cogs of the wheel C. Now, the arm G, on the lower shaft, E, may be cast in one and the same piece of metal with the shaft and pallet J. The shaft becomes the center of gyration both to the pallet and the arm. Therefore when the lower pallet is pressed downward the arm is pushed from the wheel, and the rod I, being connected to the end of the arm and also to the end of the blade H, is moved altogether to the right, while the blade slides freely in the staples. Now, it is evident that when the lower pallet is pressed downward the upper pallet is pushed upward by the connecting-wheels or segments of wheels shown at Fig. 3, they being made fast to the same shafts. Therefore the upper pallet is always ready to receive a tooth of the wheel C when one escapes from the lower pallet, and the lower one is always ready to receive the tooth as it escapes from the upper one, as appears by the dotted lines at Fig. 3. Thus a vibratory motion is communicated to the blade, its velocity being nearly uniform through the extent of each motion.

K in Fig. 2 is a block bolted between the axle and the bottom sill to allow the operator by removing the block to raise the sill in order to cut higher or lower, as required, for grain or grass.

L L in Fig. 1 are the bent rods or fingers which throw the grass in a windrow as they pass. These are to be removed and a portable apron is to be used when reaping, so as to leave the grain in regular heaps for binding. One difficulty which has been heretofore experienced is that the blade or sickle would get jambed or choked up whenever the grass is a little wet, either with rain or dew. I obviate this in my mowing-machine by having the blade play close to the fingers or staples which guide it, and by having its side like a coarse file cut much deeper and coarser than a common file, this causes the spears of grass or straws to be cut away as fast as they begin to crowd.

What I claim as new, and desire to secure by Letters Patent, is—

The combination of the crown-wheel with the shafts E E with their respective pallets J J, acted upon alternately by the cogs of the wheels, the shafts being connected so as to turn in opposite directions, whereby a vibratory motion is given to the blade. I do not claim either of these singly, but when combined for the purposes and in the manner substantially as above described.

In testimony whereof I hereto subscribe my name in the presence of two subscribing witnesses.

C. B. BROWN.

Witnesses:
JOHN L. SMITH,
A. ARNOLD.